(12) United States Patent
Hashimoto et al.

(10) Patent No.: US 11,111,869 B2
(45) Date of Patent: Sep. 7, 2021

(54) STATE DETECTION SYSTEM FOR INTERNAL COMBUSTION ENGINE, DATA ANALYSIS DEVICE, AND HYBRID VEHICLE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/928,211

(22) Filed: Jul. 14, 2020

(65) Prior Publication Data

US 2021/0033040 A1 Feb. 4, 2021

(30) Foreign Application Priority Data

Jul. 31, 2019 (JP) .............................. JP2019-140609

(51) Int. Cl.
*F02D 41/14* (2006.01)
*F02D 41/24* (2006.01)

(52) U.S. Cl.
CPC ..... *F02D 41/1498* (2013.01); *F02D 41/1454* (2013.01); *F02D 41/2441* (2013.01); *F02D 2200/101* (2013.01); *F02D 2200/1015* (2013.01)

(58) Field of Classification Search
CPC ........ F02D 41/00; F02D 41/009; F02D 41/14; F02D 41/1405; F02D 41/1454;
(Continued)

(56) References Cited

U.S. PATENT DOCUMENTS 5,442,955 A * 8/1995 Baba ................... F02D 41/1498
340/439
8,001,832 B2 8/2011 Suzuki
(Continued)

FOREIGN PATENT DOCUMENTS

JP 4-91348 A 3/1992
JP 2008-248877 A 10/2008
(Continued)

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A state detection system for an internal combustion engine includes: a memory configured to store mapping data, the mapping data being data that defines a detection mapping, the detection mapping being a mapping between an input and an output, the input being a first waveform variable and a second waveform variable and the output being a value of a combustion state variable, and the detection mapping including a joint operation of the first waveform variable and the second waveform variable based on a parameter learned by machine learning; and a processor configured to execute an acquisition process and a determination process. The acquisition process acquires a value of the first waveform variable. The determination process determines whether or not the internal combustion engine is in a predetermined operating state.

8 Claims, 9 Drawing Sheets

(58) Field of Classification Search
CPC .. F02D 41/1479; F02D 41/1498; F02D 41/24; F02D 41/2406; F02D 41/2429; F02D 41/2454; F02D 41/2461; F02D 41/34; F02D 2200/101; F02D 2200/102; F02D 2200/50; B60W 10/06; B60W 10/08; B60W 10/30; B60W 20/15; B60K 6/22; B60K 17/04; B60K 20/00; F16H 63/50; G07C 5/08; G07C 5/085
USPC .................................................. 701/110–115
See application file for complete search history.

(56) References Cited

U.S. PATENT DOCUMENTS

| | | |
|---|---|---|
| 10,214,107 B2 | 2/2019 | Fushiki et al. |
| 10,724,461 B2 | 7/2020 | Hagari |
| 2009/0308145 A1 | 12/2009 | Suzuki |
| 2015/0032358 A1* | 1/2015 | Amemiya ........... B60L 15/2054 701/104 |
| 2015/0051817 A1* | 2/2015 | Murata ................. F01L 1/3442 701/112 |
| 2017/0203753 A1* | 7/2017 | Imai ..................... B60W 10/06 |
| 2019/0178191 A1 | 6/2019 | Hagari |

FOREIGN PATENT DOCUMENTS

| | | |
|---|---|---|
| JP | 2015-112992 A | 6/2015 |
| JP | 2019-100300 A | 6/2019 |
| JP | 6547991 B1 | 7/2019 |
| JP | 6547992 B1 | 7/2019 |
| WO | WO 2015/087120 A1 | 6/2015 |

* cited by examiner

STATE DETECTION SYSTEM FOR INTERNAL COMBUSTION ENGINE, DATA ANALYSIS DEVICE, AND HYBRID VEHICLE

INCORPORATION BY REFERENCE

The disclosure of Japanese Patent Application No. 2019-140609 filed on Jul. 31, 2019 including the specification, drawings and abstract is incorporated herein by reference in its entirety.

BACKGROUND

1. Technical Field

The present disclosure relates to a system relating to an internal combustion engine mounted on a hybrid vehicle, the system being configured to detect an operating state involving variation in combustion state between cylinders, for example, to detect a misfire, or a variation in air-fuel ratio between the cylinders. The present disclosure also relates to a data analysis device that constitutes the system, and a hybrid vehicle.

2. Description of Related Art

In internal combustion engines, when the combustion states of cylinders vary due to a misfire, a variation in air-fuel ratio between the cylinders, or the like, rotation fluctuation of a crankshaft increases. Accordingly, it is possible to detect the misfire, the variation in air-fuel ratio between cylinders, or the like, based on rotation fluctuation patterns of the crankshaft. For example, Japanese Patent Application Publication No. 4-91348 discloses a misfire detection system that detects a misfire using a hierarchical neural circuit model. The hierarchical neural circuit model is configured such that time series data, obtained by sampling the rotation speed of a crankshaft of an internal combustion engine in every predetermined cycle, is input into an input layer, and information on the cylinder where a misfire has occurred is output from an output layer.

SUMMARY

Now, in a hybrid vehicle in which a crankshaft of an internal combustion engine is mechanically coupled to a motor-generator, a rotation behavior of the crankshaft also changes with a drive state of the motor-generator. Hence, the hybrid vehicle including a motor-generator as described above becomes less accurate in detecting a misfire, or the like, based on the rotation fluctuation patterns of the crankshaft, than the vehicles without the motor-generator.

A state detection system for an internal combustion engine according to a first aspect of the present disclosure is applied to the internal combustion engine including a crankshaft that is mechanically coupled with a motor-generator. The state detection system is configured to detect a predetermined operating state of the internal combustion engine, the predetermined operating state involving a variation in a combustion state between cylinders. The state detection system includes: a memory and a processor. The memory is configured to store mapping data. The mapping data is data that defines a detection mapping, the detection mapping being a mapping between an input and an output, the input being a first waveform variable and a second waveform variable and the output being a value of a combustion state variable, and the detection mapping including a joint operation of the first waveform variable and the second waveform variable based on a parameter learned by machine learning. The first waveform variable is a variable including information on a difference in rotation speed of the crankshaft between the cylinders during a period when combustion torque is generated in each of the cylinders. The second waveform variable is a variable indicating time series data of a state quantity indicating a drive state of the motor-generator. The combustion state variable is a variable relating to a degree of variation in the combustion state between the cylinders. The processor is configured to execute an acquisition process and a determination process. The acquisition process is a process of acquiring values of the first waveform variable and the second waveform variable. The value of the first waveform variable is acquired based on an output of a sensor that detects a rotation behavior of the crankshaft. The determination process is configured to determine whether or not the internal combustion engine is in the predetermined operating state, based on an output value of the detection mapping that takes the values of the first waveform variable and the second waveform variable acquired in the acquisition process as an input.

When the combustion state varies between the cylinders, the combustion torque in each of the cylinders becomes different, which causes a difference in rotation speed of the crankshaft between the cylinders, during a period when combustion torque is generated in each of the cylinders. The information on such difference in rotation speed of the crankshaft between the cylinders can be acquired from an output of a sensor that detects the rotation behavior of the crankshaft. When the difference in rotation speed of the crankshaft between the cylinders during the period of combustion torque generation is simply caused by only the variation in combustion torque between the cylinders, it is possible to accurately detect, from the information on the difference in rotation speed between the cylinders, the operating state of the internal combustion engine involving a variation in combustion state of the cylinders, such as the misfire, air-fuel ratio imbalance between the cylinders, or the like.

Meanwhile, in the internal combustion engine having a crankshaft mechanically coupled with the motor-generator, the drive state of the motor-generator influences the rotation behavior of the crankshaft. Even with the drive state of the motor-generator being the same, the degree of influence that the drive state of the motor-generator exerts on the rotation behavior of the crankshaft changes when the operating state of the internal combustion engine at the time changes. The rotation behavior of the crankshaft changes with a delay from the change in the drive state of the motor-generator.

Under these circumstances, in the above configuration, in consideration that the variation in combustion state between cylinders causes a difference in rotation speed of the crankshaft during a combustion torque generation period, an input into the detection mapping includes the first waveform variable including the information on the difference in rotation speed between cylinders. In consideration that the change in drive state of the motor-generator exerts an influence on the rotation behavior of the crankshaft with a delay, the input into the detection mapping also include the second waveform variable indicating time series data of the state quantity representing the drive state. In the configuration, the presence or absence of an occurrence of the predetermined operating state is determined based on the value of a combustion state variable calculated through joint operation of the first waveform variable and the second waveform variable based on a parameter learned by machine learning. The parameter referred herein can be learned based on the presence or absence of an occurrence of the predetermined operating state when the first waveform variable and second waveform variable as described above take various values. Accordingly, the state detection can be conducted by taking the influence that the drive state of the motor-generator exerts on the rotation behavior of the crankshaft into account. Therefore, it is possible to enhance the detecting accuracy of the predetermined operating state in the internal combustion engine having the crankshaft mechanically coupled with the motor-generator.

In the above aspect, the predetermined operating state may be a state where a misfire has occurred. In the above aspect, the predetermined operating state may be a state where an air-fuel ratio varies between the cylinders. In the aspect, the state quantity may be torque of the motor-generator.

In the above aspect, when it is determined by the determination process that the internal combustion engine is in the predetermined operating state, the processor may be configured to operate prescribed hardware to execute a handling process that handles the predetermined operating state. The handling process includes, for example, a process of notifying an occupant that the internal combustion engine is in a predetermined operating state, and a process of eliminating or reducing the predetermined operating state.

In the aspect, the determination process may include an output value calculation process for calculating an output value of the detection mapping that takes the values of the first waveform variable and the second waveform variable acquired in the acquisition process as an input. The processor may include a first processor mounted on a vehicle, and a second processor disposed outside the vehicle. The first processor may be configured to execute the acquisition process and a vehicle-side reception process for receiving a signal based on a calculation result of the output value calculation process. The second processor may be configured to execute the output value calculation process and an outer-side transmission process for transmitting to the vehicle a signal based on the calculation result of the output value calculation process. In these cases, the output value calculation process that is high in arithmetic load is performed outside the vehicle. Hence, the arithmetic load on the vehicle side can be reduced.

A data analysis device according to a second aspect of the present disclosure includes the second processor and the memory.

A hybrid vehicle according to a third aspect of the present disclosure includes the first processor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a state detection system for an internal combustion engine will be described with reference to FIGS. 1 to 4.

Figure 1:
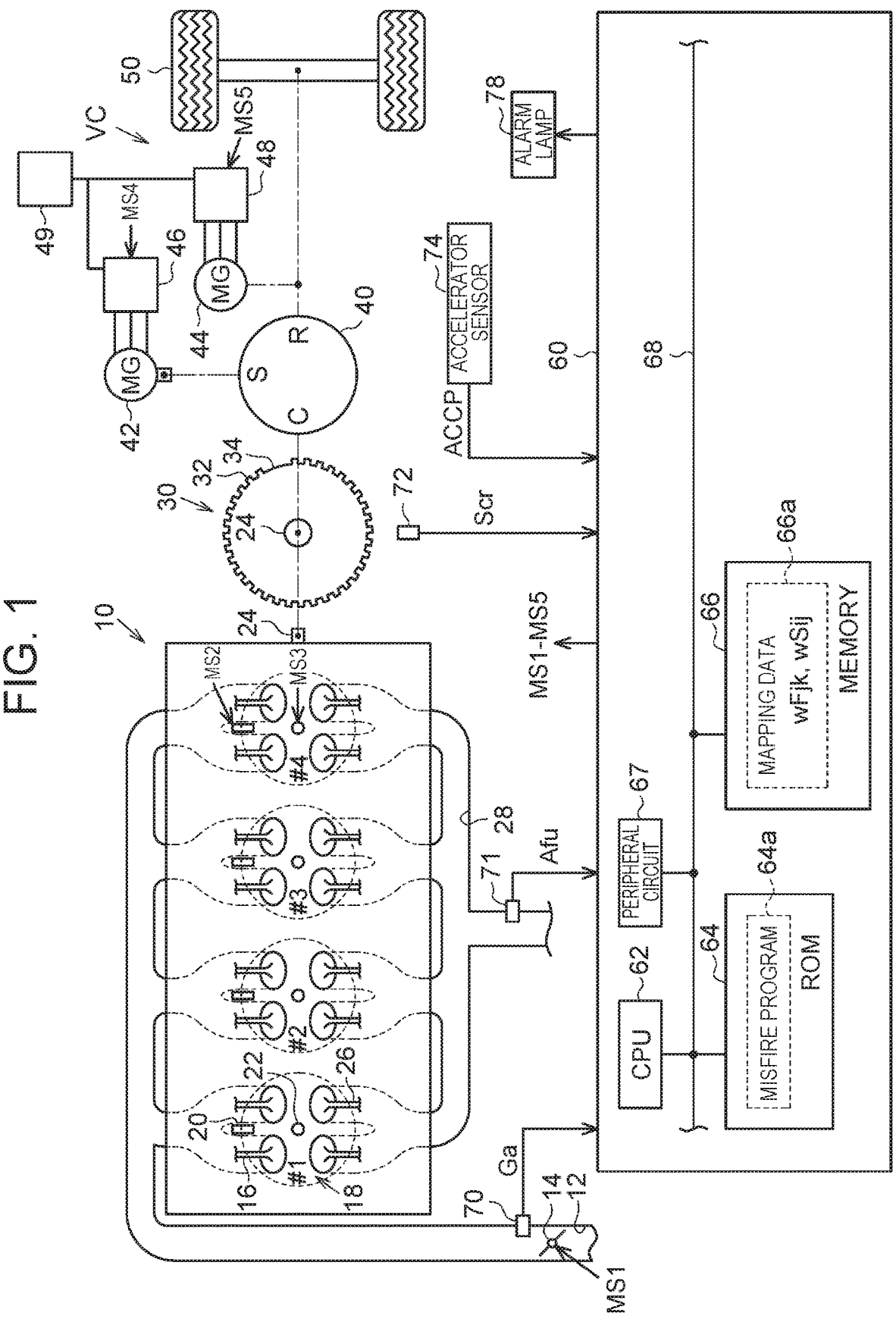
FIG. 1 schematically shows the configuration of a drive system of a hybrid vehicle that incorporates a state detection system according to a first embodiment and an internal combustion engine to which the state detection system is applied.

In an internal combustion engine 10 mounted on a hybrid vehicle VC shown in FIG. 1, an intake passage 12 is provided with a throttle valve 14. The air taken in from the intake passage 12 flows into combustion chambers 18 of cylinders #1 to #4, when intake valves 16 are opened. Fuel is injected into the combustion chambers 18 with fuel injection valves 20. In the combustion chambers 18, mixture of air and fuel is used for combustion through spark discharge by ignition devices 22. Energy generated by combustion is taken out as rotational energy of a crankshaft 24. The air-fuel mixture used for combustion is discharged to an exhaust passage 28 as an exhaust gas, when exhaust valves 26 are opened.

The crankshaft 24 is joined with a crank rotor 30 provided with a plurality of (thirty-four herein) tooth portions 32 indicative of a rotation angle of the crankshaft 24. Although the crank rotor 30 is basically provided with the tooth portions 32 at intervals of 10° CA, an untoothed portion 34 is provided in a spot where an interval with the adjacent tooth portions 32 is 30° CA. The untoothed portion 34 is provided to indicate a reference rotation angle of the crankshaft 24.

The crankshaft 24 is mechanically coupled with a carrier C of a planetary gear mechanism 40 that constitutes a power split device. The planetary gear mechanism 40 has a sun gear S that is mechanically coupled with a rotary shaft of a first motor-generator 42. The planetary gear mechanism 40 has a ring gear R that is mechanically coupled with a rotary shaft of a second motor-generator 44 and with driving wheels 50. The first motor-generator 42 has terminals each connected to an inverter 46, and the second motor-generator 44 has terminals each connected to an inverter 48. The inverters 46, 48 are each further connected to a battery 49. The inverter 46 applies alternating voltage to each of the terminals of the first motor-generator 42, and the inverter 48 applies alternating voltage to each of the terminals of the second motor-generator 44.

A controller 60 controls the internal combustion engine 10. In order to control controlled variables such as torque and an exhaust gas component ratio, the controller 60 operates operation units, such as the throttle valve 14, the fuel injection valves 20, and the ignition devices 22 of the internal combustion engine 10. The controller 60 also controls the first motor-generator 42. In order to control controlled variables, such as torque and rotation speed of the first motor-generator 42, the controller 60 operates the inverter 46. The controller 60 also controls the second motor-generator 44. In order to control controlled variables, such as torque and rotation speed of the second motor-generator 44, the controller 60 operates the inverter 48. In FIG. 1, operation signals MS1 to MS5 of the throttle valve 14, the fuel injection valves 20, the ignition devices 22, and the inverters 46, 48 are illustrated.

When controlling the controlled variables, the controller 60 refers to an intake air amount Ga detected by an air flowmeter 70, an output signal Scr of a crank angle sensor 72, an accelerator operation amount ACCP that is a depression amount of an accelerator pedal detected by an accelerator sensor 74, a state of charge SOC of the battery 49, a vehicle speed V, etc. The exhaust passage 28 is provided with an air-fuel ratio sensor 71. When controlling the controlled variables, the controller 60 also refers to a detection value of the air-fuel ratio sensor 71. Incidentally, the air-fuel ratio sensor 71 outputs a detection signal corresponding to the components of exhaust gas before being cleaned by an exhaust gas cleaning catalyst. The detection value corresponds to the air-fuel ratio of air-fuel mixture combusted in the combustion chambers 18 of the cylinders #1 to #4. In the following description, the detection value of the air-fuel ratio sensor 71 is stated as an upstream-side detection value Afu.

The controller 60 includes a CPU 62, a ROM 64, a memory 66 that is electrically rewritable nonvolatile memory, and a peripheral circuit 67, which can communicate with each other through a bus 68. The peripheral circuit 67 includes a circuit for generating a clock signal that defines internal operation, an electric power source circuit, and a reset circuit. The controller 60 executes drive control of the hybrid vehicle VC, when the CPU 62 executes a program stored in the ROM 64. In the present embodiment, the controller 60 corresponds to the state detection system.

Figure 2:
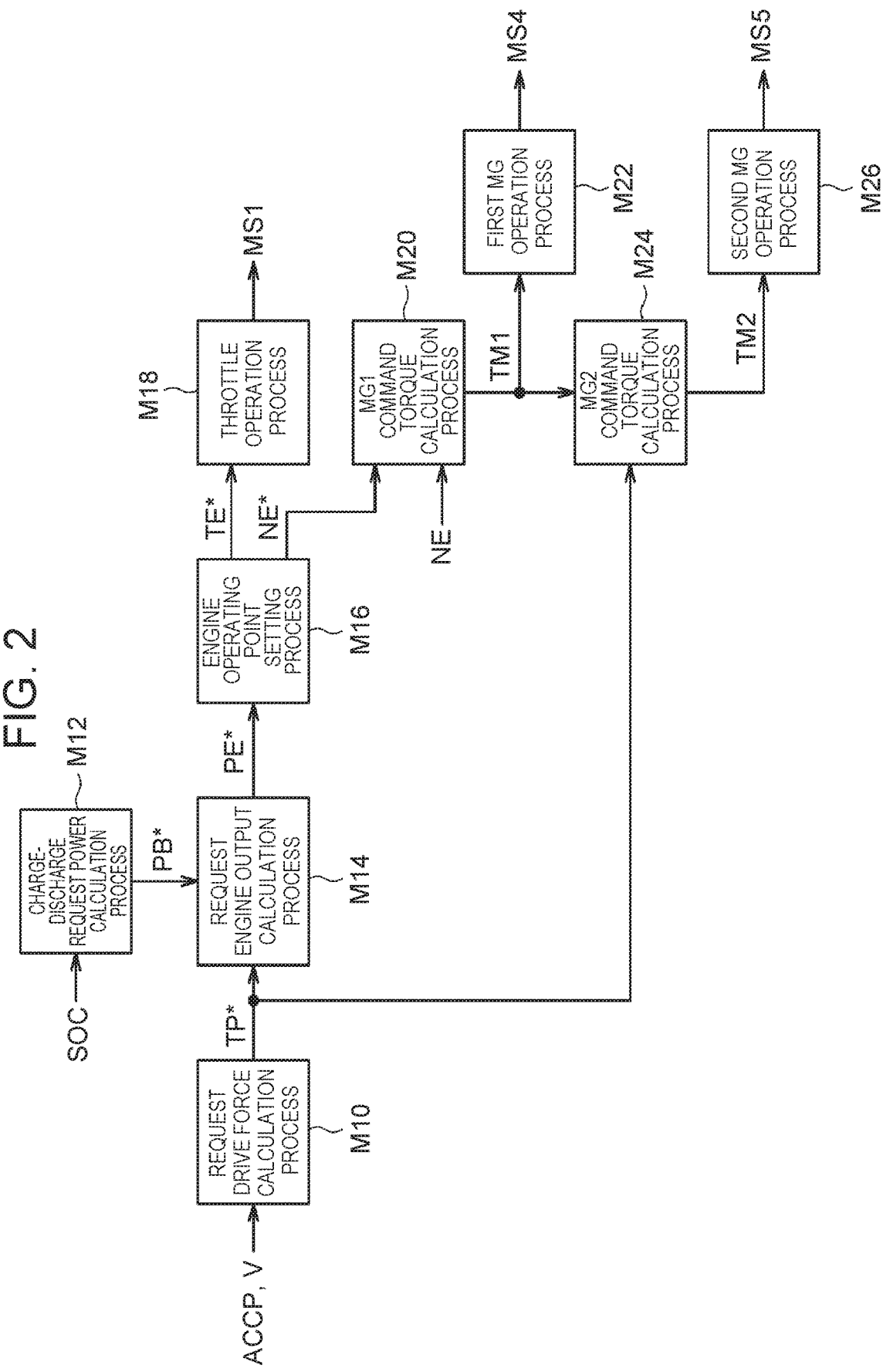
FIG. 2 is a control block diagram of a process relating to drive force control of the hybrid vehicle.

FIG. 2 shows a process flow of the CPU 62 relating to the drive control of the hybrid vehicle VC. The processes shown in FIG. 2 are implemented when the CPU 62 executes a program stored in the ROM 64. The CPU 62 repeatedly executes a series of the processes shown in FIG. 2 in every predetermined control cycle.

In a request drive force calculation process M10, the CPU 62 calculates a value of request drive force TP* that is a request value of the drive force of the hybrid vehicle VC, based on the accelerator operation amount ACCP and the vehicle speed V. In a charge-discharge request power calculation process M12, the CPU 62 calculates, as a value of charge-discharge request power PB*, a request value of the drive force used for charge-discharge control of the battery 49 for maintaining the state of charge SOC within the values of a predetermined control range. When the battery 49 needs to be discharged, the charge-discharge request power PB* is calculated as a positive value. When the battery 49 needs to be charged, the charge-discharge request power PB* is calculated as a negative value.

In a request engine output calculation process M14, the CPU 62 calculates the value of request engine output PE* that is a request value of the output of the internal combustion engine 10, based on the calculation results of the requested drive force TP* and the charge-discharge request power PB*. Specifically, a sum obtained by adding the charge-discharge request power PB* to the request driving force TP* is provided as a value of the request engine output PE*.

In an engine operating point setting process M16, the CPU 62 calculates, based on the request engine output PE*, target engine torque TE* and target engine speed NE* that are target values of torque and rotation speed of the internal combustion engine 10. Specifically, the torque and the rotation speed at an operating point where fuel efficiency is the highest, out of a group of the operating points of the internal combustion engine 10 where an output corresponding to the value of the request engine output PE* can be provided, are calculated as the values of the targeted engine torque TE* and the target engine speed NE*, respectively.

In a throttle operation process M18, the CPU 62 performs a process of outputting an operation signal MS1 to the throttle valve 14 so as to adjust an opening degree of the throttle valve 14 to be the opening degree where the torque corresponding to the value of the targeted engine torque TE* can be provided.

In an MG1 command torque calculation process M20, the CPU 62 calculates, based on the rotation speed NE and the target engine speed NE* of the internal combustion engine 10, the torque of the first motor-generator 42 that is necessary to match the rotation speed NE with the target engine speed NE*, as a value of MG1 command torque TM1. In a first MG operation process M22, the CPU 62 performs a process of outputting an operation signal MS4 to the inverter 46 so as to adjust the torque of the first motor-generator 42 to be the MG1 command torque TM1. The rotation speed NE is calculated by the CPU 62 based on the output signal Scr. Incidentally, the rotation speed NE is desirably an average value of the rotation speeds when the crankshaft 24 rotates by a rotation angle equal to or greater than one rotation of the crankshaft 24. Without being limited to the value obtained by a simple arithmetic average process, the average value may be obtained by, for example, an index moving average process. In that case, the average value is calculated based on time series data of the output signal Scr when the crankshaft 24 rotates by a rotation angle of one rotation or more.

In a MG2 command torque calculation process M24, the CPU 62 calculates, as a value of MG2 command torque TM2, the torque of the second motor-generator 44 that provides the drive force corresponding to the request drive force TP* in the state where the first motor-generator 42 is generating the torque corresponding to the value of the MG1 command torque TM1. In a second MG operation process M26, the CPU 62 performs a process of outputting the operation signal MS5 to the inverter 48 so as to adjust the torque of the second motor-generator 44 to be the MG2 command torque TM2.

Figure 3:
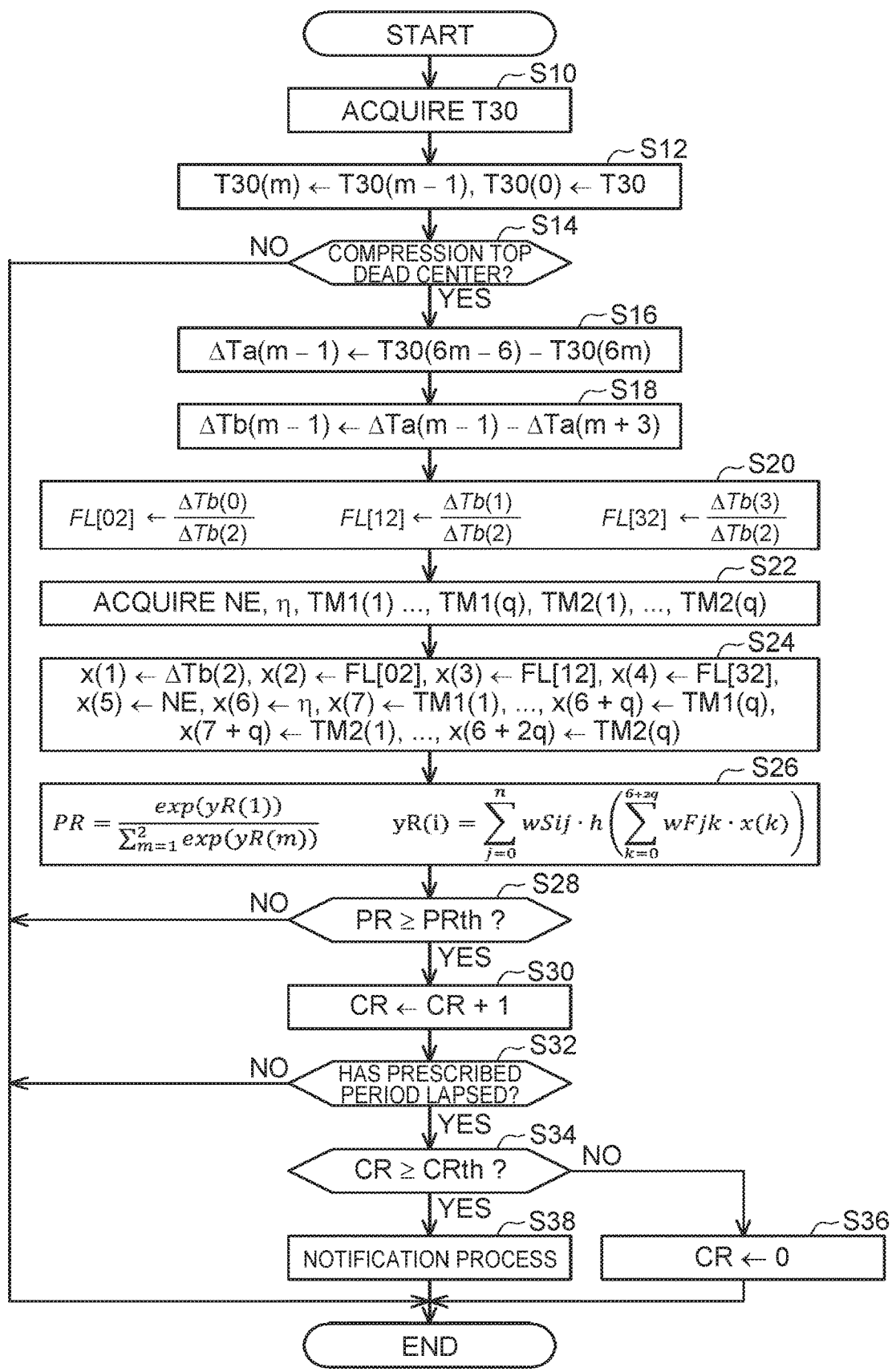
FIG. 3 is a flowchart of a process defined as a misfire program in the state detection system of the first embodiment.

Furthermore, while the internal combustion engine 10 is in operation, the controller 60 determines the presence or absence of a misfire. FIG. 3 shows the procedures of processes relating to detection of a misfire. The processes shown in FIG. 3 are implemented when the CPU 62 repeatedly executes a misfire program 64a stored in the ROM 64 in a prescribed cycle, for example. Hereinafter, the step number of each process will be expressed by numerals prepended with "S".

In a series of processes shown in FIG. 3, the CPU 62 first acquires minute rotation time T30 (S10). The CPU 62 calculates the minute rotation time T30 by checking the time taken for the crankshaft 24 to rotate by 30° CA, based on the output signal Scr of the crank angle sensor 72. Next, the CPU 62 sets latest minute rotation time T30 acquired in the process of S10 as the minute rotation time T30(0). As the minute rotation time T30 is older, a variable "m" in the minute rotation time T30($m$) becomes larger (S12). More specifically, on the assumption that m=1, 2, 3, . . . , minute rotation time T30($m$−1) immediately before execution of the process of S12 is defined as minute rotation time T30($m$).

Accordingly, for example, the minute rotation time T30, acquired in the process of S10 when the processes of FIG. 3 are executed last time, becomes minute rotation time T30(1).

Next, the CPU 62 determines whether or not the minute rotation time T30 acquired in the process of S10 is equal to the time taken for rotation of an angular interval from 30° CA before a compression top dead center to the compression top dead center in any one of the cylinders #1 to #4 (S14). When determining that the minute rotation time T30 is the time taken for rotation of the angular interval to the compression top dead center (S14: YES), the CPU 62 first calculates the value of a first waveform variable that is used as an input of the process of determining the presence or absence of a misfire, in order to determine the presence or absence of a misfire in the cylinder that has reached the compression top dead center before 360° CA.

Specifically, the CPU 62 first calculates, as an inter-cylinder variable ΔTa, a difference between values of the minute rotation time T30 relating to an angular interval from 30° CA before the compression top dead center to the compression top dead center, the values being separated by 180° from each other (S16). More specifically, on the assumption that "m=1, 2, 3 . . . ", the CPU 62 sets the inter-cylinder variable ΔTa(m−1) to "T30(6 m−6)−T30(6 m)".

Figure 4:
FIG. 4 shows a setting aspect of input variables of a mapping in the embodiment.

FIG. 4 illustrates the inter-cylinder variable ΔTa. In the present embodiment, the compression top dead center appears in order of the cylinder #1, the cylinder #3, the cylinder #4, and the cylinder #2, and power stroke starts in this order.

FIG. 4 indicates that the target for detecting the presence or absence of a misfire is the cylinder #1 by acquiring the minute rotation time T30 of the cylinder #4 at an angular interval from 30° CA before the compression top dead center to the compression top dead center in the process of S10. In this case, an inter-cylinder variable ΔTa(0) is a difference between the minute rotation time T30 corresponding to the compression top dead center of the cylinder #4 and the minute rotation time T30 corresponding to the compression top dead center of the cylinder #3 which is at the compression top dead center before the cylinder #4. In FIG. 4, an inter-cylinder variable ΔTa(2) is a difference between minute rotation time T30(12) corresponding to the compression top dead center of the cylinder #1 that is a misfire detection target and minute rotation time T30(18) corresponding to the compression top dead center of the cylinder #2.

With reference to FIG. 3 again, the CPU 62 calculates an inter-cylinder variable ΔTb that is a difference between values separated by 720° CA from each other, out of the inter-cylinder variables ΔTa(0), ΔTa(1), ΔTa(2), . . . (S18). Specifically, on the assumption that "m=1, 2, 3 . . . ", the CPU 62 sets the inter-cylinder variable ΔTb(m−1) to "ΔTa (m−1)−ΔTa (m+3)".

FIG. 4 illustrates the inter-cylinder variable ΔTb. In FIG. 4, it is stated that the inter-cylinder variable ΔTb(2) is "ΔTa(2)−Ta(6)." Next, the CPU 62 calculates a fluctuation pattern variable FL indicating a relative size relation between the inter-cylinder variable ΔTb corresponding to the cylinder that is a misfire detection target and the inter-cylinder variable ΔTb corresponding to the other cylinders (S20). In the present embodiment, fluctuation pattern variables FL[02], FL[12], FL[32] are calculated.

Here, the fluctuation pattern variable FL[02] is defined by "ΔTb(0)/ΔTb (2)." More specifically, when the example of FIG. 4 is used, the fluctuation pattern variable FL[02] is a value obtained by dividing the inter-cylinder variable ΔTb (0), corresponding to the cylinder #4 that will be at the compression top dead center after the cylinder #1 and cylinder #2, by the inter-cylinder variable ΔTb(2) corresponding to the cylinder #1 that is the detection target of a misfire. The fluctuation pattern variable FL[12] is defined by "ΔTb(1)/ΔTb(2)." More specifically, when the example of FIG. 4 is used, the fluctuation pattern variable FL[12] is a value obtained by dividing an inter-cylinder variable ΔTb (1), corresponding to the cylinder #3 that will be at the compression top dead center after the cylinder #1, by the inter-cylinder variable ΔTb(2) corresponding to the cylinder #1 that is a misfire detection target. The fluctuation pattern variable FL[32] is defined by "ΔTb(3)/ΔTb(2)." More specifically, when the example of FIG. 4 is used, the fluctuation pattern variable FL[32] is a value obtained by dividing an inter-cylinder variable ΔTb(3), corresponding to the cylinder #2 that was at the compression top dead center before the cylinder #1, by the inter-cylinder variable ΔTb(2) corresponding to the cylinder #1 that is a misfire detection target.

In the present embodiment, the thus-calculated values of the inter-cylinder variable ΔTb(2), and the fluctuation pattern variables FL[02], FL [12], FL [32] are used as information on a difference in rotation speed of the crankshaft 24 between the cylinders during the period when combustion torque is generated in each of the cylinders.

Next, the CPU 62 acquires each value of the rotation speed NE, a charging efficiency η, and drive state variables TM1(1) to TM1($q$), TM2(1) to TM2($q$) (S22). Note that following values are stored in the drive state variables TM1(1) to TM1($q$), TM2(1) to TM2($q$), respectively. In the following description, "q" represents a constant that is predetermined as an integer greater than or equal to two, and "N" represents any natural number from two to the constant q.

In every predetermined sampling cycle, the CPU 62 acquires the torque of the first motor-generator 42 and the torque of the second motor-generator 44 based on the operation signals MS4, MS5, and substitutes the values into the drive state variable TM1(1) and the drive state variable TM2(1), respectively. The CPU 62 in this case also substitutes the value of the drive state variable TM1 (N−1) till then to the drive state variable TM1(N), and substitutes the value of the drive state variable TM2(N−1) till then to the drive state variable TM2(N), respectively. Thus, the time series data of the torque of the first motor-generator 42 in every sampling cycle is stored in the drive state variable TM1(1) to TM1($q$), and time series data of the torque of the second motor-generator 44 in every sampling cycle is stored in the drive state variables TM2(1) to TM2($q$), respectively. In the following description, such drive state variables TM1(1) to TM1($q$), TM2(1) to TM2($q$) are stated as the second waveform variable.

Next, the CPU 62 substitutes the value of the first waveform variable acquired in the processes of S18, S20, and the values of the variable acquired in the process of S22 into input variables x(1) to x(7+2q) of a mapping that outputs a combustion state variable PR that is a variable regarding the probability of occurrence of a misfire in the cylinder that is a detection target (S24). The values of the variable acquired in the process of S22 includes the second waveform variable as described above. Specifically, in the process of S24, the CPU 62 substitutes the value of the inter-cylinder variable ΔTb(2) into the input variable x(1), the value of the fluctuation pattern variable FL[02] into the input variable x(2), the value of the fluctuation pattern variable FL[12] into the input variable x(3), and the value of the fluctuation pattern variable FL[32] into the input variable x(4), respectively.

The CPU 62 also substitutes the value of the rotation speed NE into the input variable x(5), and substitutes the value of the charging efficiency η into the input variable x(6), respectively. The CPU 62 further substitutes the values of TM1(1) to TM1($q$) into the input variables x(7) to x(6+q), and substitutes the values of TM2(1) to TM2($q$) into the input variables x(7+q) to x(6+2q), respectively.

Next, the CPU 62 inputs the values of the input variable x(1) to x(6+2q) into the mapping that is defined by mapping data 66a stored in the memory 66 shown in FIG. 1 so as to calculate the value of the combustion state variable PR that is an output value of the mapping (S26).

In the present embodiment, the mapping is constituted of a neural network having one intermediate layer. The neural network includes an input-side coefficient wFjk (j=0 to n, k=0 to 7+2q), and an activation function h(x) as an input-side nonlinear mapping that performs nonlinear conversion of each of the outputs of an input-side linear mapping that is a linear mapping defined by the input-side coefficient wFjk. In the present embodiment, a function ReLU is illustrated as the activation function h(x). The function ReLU outputs a larger one of an input and "0". Incidentally, the coefficient wFj0, or the like, is a bias parameter, and the input variable x(0) is defined as "1". In the following description, the mapping is stated as a detection mapping.

The neural network includes a softmax function that outputs the combustion state variable PR, by taking each of an output-side coefficient wSij (i=1 to 2, j=0 to n) and prototype variables yR(1), yR(2) as an input, the prototype variables yR(1), yR(2) being an output of an output-side linear mapping that is a linear mapping defined by the output-side coefficient wSij. Hence, in the present embodiment, the combustion state variable PR is a value representing the magnitude of likelihood that a misfire actually occurs, the value being quantified as a continuous value in a specified region larger than "0" and smaller than "1".

Next, the CPU 62 determines whether or not the value of the combustion state variable PR is equal to or larger than a determination value PRth (S28). When determining that the value of the combustion state variable PR is equal to or larger than the determination value PRth (S28: YES), the CPU 62 increments a counter CR (S30). The CPU 62 then determines whether or not a prescribed period has lapsed from the time when the process of S28 was first executed or from the time when a process of S36 described later was executed (S32). Here, the prescribed period is longer than the period of one combustion cycle, and is desirably ten times as long as one combustion cycle or longer.

When determining that the prescribed period has lapsed (S32: YES), the CPU 62 determines whether or not the counter CR is equal to or greater than a threshold CRth (S34). The process of S34 is a process of determining whether or not a misfire has occurred at frequency beyond an allowable range. When determining that the counter CR is less than the threshold CRth (S34: NO), the CPU 62 initializes the counter CR (S36). On the contrary, when determining that the counter CR is equal to or greater than the threshold CRth (S34: YES), the CPU 62 executes a notification process that operates an alarm lamp 78 shown in FIG. 1 in order to encourage a user to cope with the abnormality (S38).

When the processes of S36, S38 are completed, or when negative determination is made in the processes of S14, S28, S32, the CPU 62 temporarily terminates a series of the processes shown in FIG. 3. Incidentally, the mapping data 66a is generated as shown below, for example. That is, the internal combustion engine 10 is operated while the crankshaft 24 is connected to a dynamometer in a test bench. In this state, fuel injection is stopped at a timing randomly selected out of the timing when fuel injection is requested in each of the cylinders #1 to #4. In the cylinder where fuel injection is stopped, data on the combustion state variable PR having a value of "1" is used as teacher data, while in the cylinders where fuel injection is not stopped, data on the combustion state variable PR having a value of "0" is included in the teacher data. With use of the first waveform variable acquired each time and the value acquired in the process of S22, the value of the combustion state variable PR is calculated by the same processes as in S24, S26. The values of the input-side coefficient wFjk and the output-side coefficient wSij are learned so as to reduce difference between the thus-learned combustion state variable PR and the teacher data. Specifically, the values of the input-side coefficient wFjk and the output-side coefficient wSij may be learned so as to minimize cross entropy, for example. The torque of the first motor-generator 42 and the second motor-generator 44 can be simulated with the torque applied to the crankshaft 24 by the dynamometer. Thus, when machine learning is used, the mapping data 66a can be learned by using the teacher data that is generated by taking various operating points, while operating the internal combustion engine 10 relatively freely. Accordingly, the number of adaptable processes can be reduced as compared with the case where map data is adapted based on detected behavior of the crankshaft 24 in the presence or absence of a misfire for each of the various operating points.

Here, the functions and effects of the present embodiment will be described. The CPU 62 determines the presence or absence of a misfire by calculating the value of the combustion state variable PR based on the values of the first waveform variable and the second waveform variable described above. As described before, the first waveform variable is assumed to be a variable including information on inter-cylinder difference in rotation speed of the crankshaft (24) during a period when combustion torque is generated in each of the cylinders. The second waveform variable is assumed to be a variable indicating the time series data of the torque of the first motor-generator 42 and the second motor-generator 44.

When a misfire occurs in the internal combustion engine 10, combustion torque becomes different between the cylinders, which causes an increased fluctuation of the minute rotation time T30. Meanwhile, the crankshaft 24 of the internal combustion engine 10 mounted on the hybrid vehicle VC is mechanically coupled with the first motor-generator 42 and the second motor-generator 44. Accordingly, the drive states of these generators influence the rotation behavior of the crankshaft 24. Even with the drive states, such as torque, of the first motor-generator 42 and the second motor-generator 44 being the same, the degree of influence that the drive states of the first motor-generator 42 and the second motor-generator 44 exert on the rotation behavior of the crankshaft 24 changes when the operating state of the internal combustion engine 10 at that time changes. The rotation behavior of the crankshaft 24 changes with a delay from the change in the drive states of the first motor-generator 42 and the second motor-generator 44.

Contrary to this, in the present embodiment, an input to the detection mapping includes the first waveform variable and the second waveform variable. The first waveform variable is a variable including information on inter-cylinder difference in rotation speed of the crankshaft 24 during the period of combustion torque generation. The second waveform variable is a variable indicating the time series data of the torque of the first motor-generator 42 and the torque of the second motor-generator 44. The presence or absence of a misfire is determined based on the value of the combustion state variable PR calculated through joint operation of the first waveform variable and the second waveform variable based on the parameter learned by machine learning. The parameter referred herein can be learned based on the presence or absence of a misfire when the first waveform variable and second waveform variable as described above take various values. Accordingly, misfire detection can be conducted by taking the influence that the drive states of the first motor-generator 42 and the second motor-generator 44 exert on the rotation behavior of the crankshaft 24 into account. Therefore, it is possible to enhance the detecting accuracy of a misfire in the internal combustion engine 10 having the crankshaft 24 that is mechanically coupled with the first motor-generator 42 and the second motor-generator 44.

According to the present embodiment described in the foregoing, the operational effects as described below are further achieved. (1) The rotation speed NE and the charging efficiency η as operating point variables that define the operating point of the internal combustion engine 10 are used as an input of the detection mapping. The operation amount of the operation units of the internal combustion engine 10, such as the fuel injection valves 20 or the ignition devices 22, tends to be determined based on the operating point of the internal combustion engine 10. Accordingly, the operating point variable is a variable including the information regarding the operation amount of each of the operation units. Therefore, when the operating point variable is used as an input of the detection mapping, the value of the combustion state variable PR can be calculated based on the information regarding the operation amount of each of the operation units. As a result, the value of the combustion state variable PR can be calculated with higher accuracy since the rotation behavior of the crankshaft 24 changed by the operation amount is reflected on the combustion state variable PR.

When the operating point variable is used as an input variable, the value of the combustion state variable PR is calculated through joint operation of the first waveform variable and the operating point variable with use of the input-side coefficient wFjk that is a parameter learned by machine learning. Accordingly, it is not required to adapt an adaptation value for every operating point variable. Contrary to this, in the case where, for example, size comparison between the inter-cylinder variable ΔTb and a determination value is performed, it is required to adapt the determination value for every operating point variable, which causes an increased number of adaptable processes.

(2) The second waveform variable that is a variable indicating the time series data of the torque of the first motor-generator 42 and the torque of the second motor-generator 44 are included in the input variables of the detection mapping. This makes it possible to calculate the value of the combustion state variable PR as a value reflecting the influence that the drive states of the first motor-generator 42 and the second motor-generator 44 exert on the rotation fluctuation of the crankshaft 24, and in extension to achieve high-accuracy misfire detection reflecting the influence.

(3) The first waveform variable to be used as an input variable x is generated by selectively using the values of the minute rotation time T30 in the vicinity of the compression top dead center. The values of the minute rotation time T30 that present a largest difference due to the presence or absence of a misfire are those in the vicinity of the compression top dead center. Accordingly, selectively using the values in the vicinity of the compression top dead center, out of the values of the minute rotation time T30, can restrain the dimension of the input variable x from increasing, and makes it possible to take in the information, necessary for determining the presence or absence of a misfire, as much as possible.

(4) The first waveform variable includes the inter-cylinder variable ΔTb(2). The inter-cylinder variable ΔTb(2) is a difference in values of the minute rotation time T30 in the vicinity of the compression top dead center between a cylinder that is a misfire detection target and a cylinder adjacent thereto, the difference being quantified in one dimension in advance. Accordingly, the information necessary for determining the presence or absence of a misfire can efficiently be taken in with a variable having a small number of dimensions.

(5) The first waveform variable includes the fluctuation pattern variable FL in addition to the inter-cylinder variable ΔTb(2). Since vibration from a road surface, or the like, is overlapped on the crankshaft 24, there is a concern that erroneous determination may be made when only the inter-cylinder variable ΔTb(2) is used as the first waveform variable. As a solution, in the present embodiment, the value of the combustion state variable PR is calculated using the fluctuation pattern variable FL in addition to the inter-cylinder variable ΔTb(2). Accordingly, as compared with the case where the value of the combustion state variable PR is calculated only from the inter-cylinder variable ΔTb(2), the value of the combustion state variable PR can be presented as a value that indicates more accurate degree of likelihood (probability) that a misfire has occurred.

Furthermore, in the present embodiment, the value of the combustion state variable PR is calculated through joint operation of the inter-cylinder variable ΔTb(2) and the fluctuation pattern variable FL with use of the input-side coefficient wFjk that is a parameter learned by machine learning. Accordingly, as compared with the case where the presence or absence of a misfire is determined based on the comparison between the inter-cylinder variable ΔTb(2) and the determination value, and on the comparison between the fluctuation pattern variable FL and the determination value, the presence or absence of a misfire can be determined based on a more detailed relationship between the variables including the inter-cylinder variable ΔTb(2) and the fluctuation pattern variable FL, and the misfire.

Second Embodiment

Hereinafter, a second embodiment will be described with the attention mainly given to the differences from the first embodiment with reference to the drawings.

Figure 5:
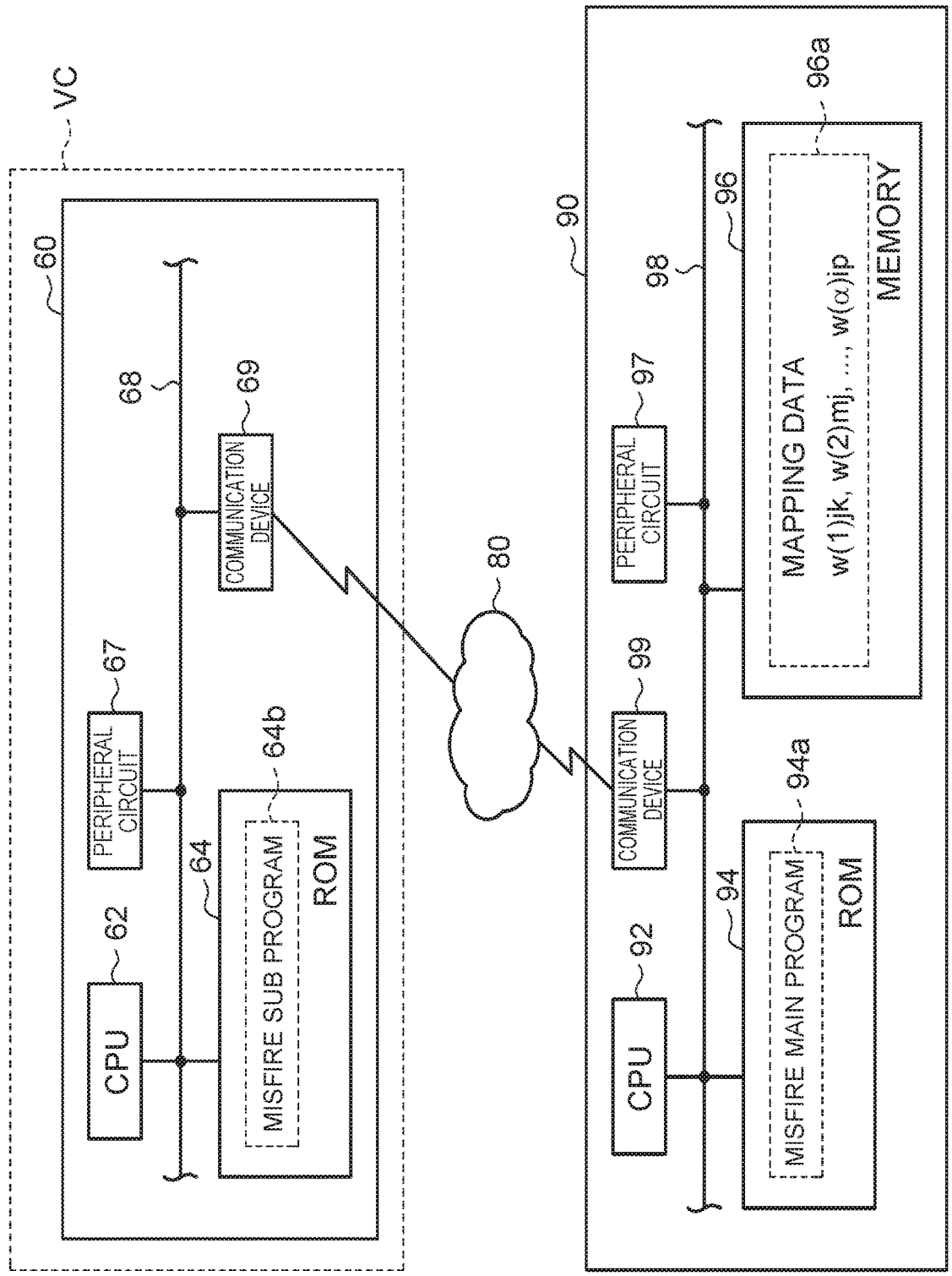
FIG. 5 schematically shows the configuration of the state detection system of a second embodiment.

In the present embodiment, the process of calculating the combustion state variable PR is performed outside the vehicle. FIG. 5 shows a state detection system according to the present embodiment. In FIG. 5, component members corresponding to those shown in FIG. 1 are designated by the same numerals for convenience.

A controller 60 in a hybrid vehicle VC shown in FIG. 5 includes a communication device 69. The communication device 69 is a device for communicating with a center 90 through a network 80 outside the hybrid vehicle VC.

The center 90 analyzes data transmitted from a plurality of hybrid vehicles VC. The center 90 includes a CPU 92, a ROM 94, a memory 96, a peripheral circuit 97, and a communication device 99, which can communicate through a bus 98. The memory 96 stores mapping data 96a. In the present embodiment, the center 90 and the controller 60 of the hybrid vehicle VC constitute a state detection system.

Figure 6:
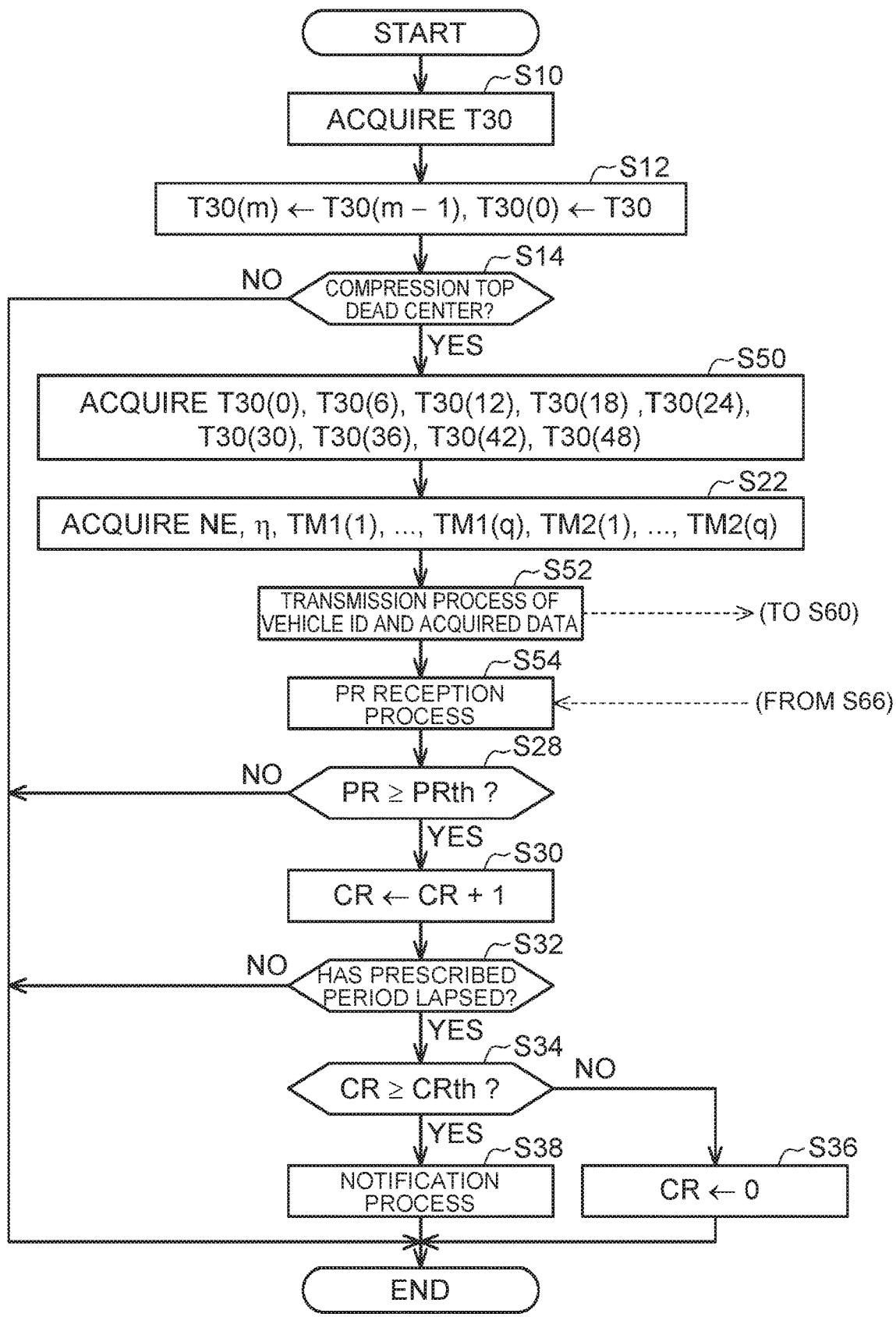
FIG. 6 is a flowchart of a vehicle-side process in the state detection system.
Figure 7:
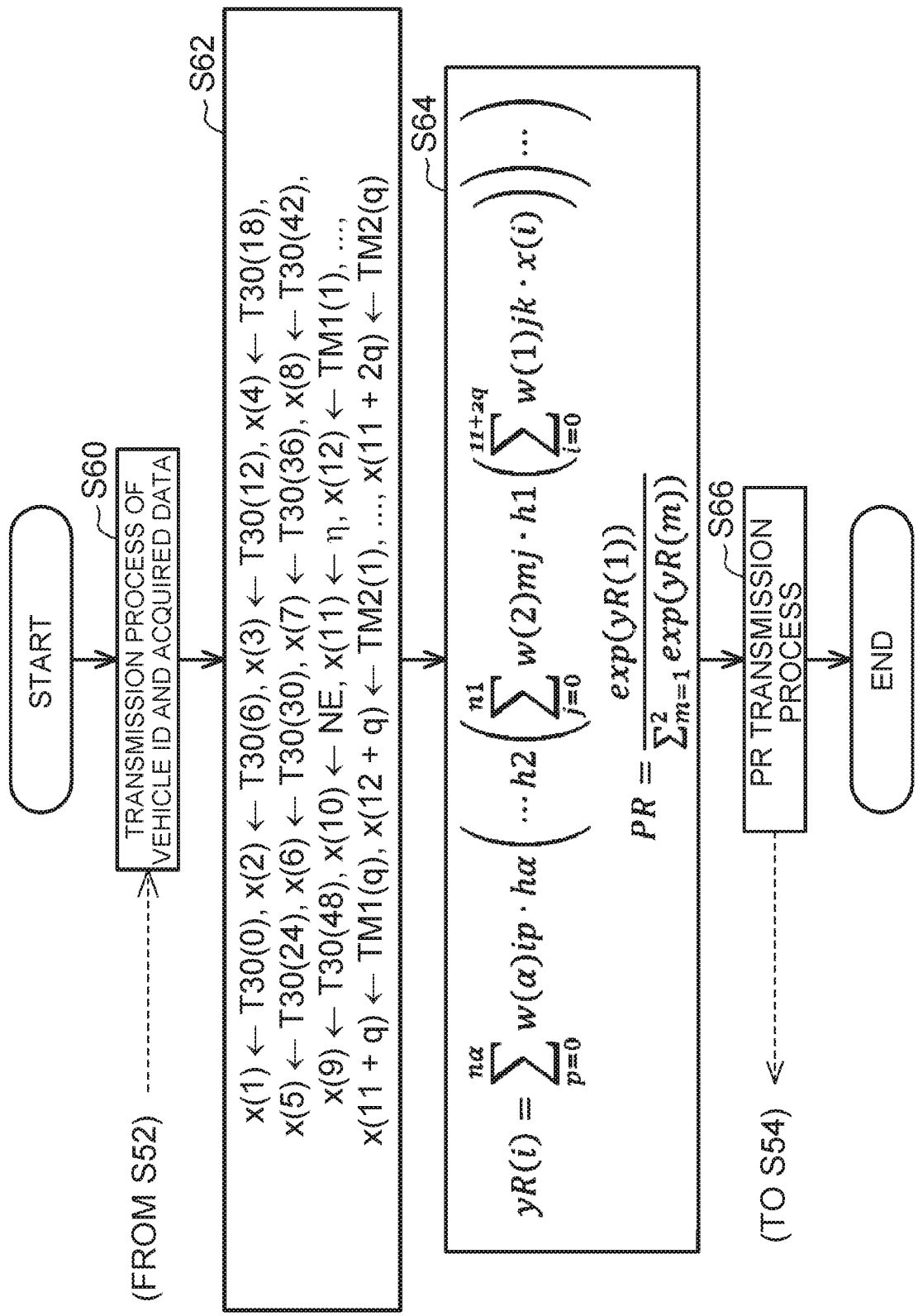
FIG. 7 is a flowchart of a center-side process in the state detection system.

FIGS. 6 and 7 show the procedures of the processes regarding detection of a misfire according to the present embodiment. The processes shown in FIG. 6 are implemented when the CPU 62 executes a misfire subprogram 64b stored in the ROM 64 shown in FIG. 5. The processes shown in FIG. 7 are implemented when the CPU 92 executes a misfire main program 94a stored in the ROM 94. The processes in FIGS. 6 and 7 corresponding to the processes shown in FIG. 3 are designated by the same step numbers for convenience. Hereinafter, based on the time series of the misfire detection process, the processes shown in FIGS. 6 and 7 will be described.

Specifically, in the hybrid vehicle VC, when positive determination is made in the process of S14 shown in FIG. 6, the CPU 62 acquires minute rotation time T30(0), T30(6), T30(12), T30(18), T30(24), T30(30), T30(36), T30(42), T30(48) (S50). These values of the minute rotation time T30 constitute a first waveform variable that is a variable including the information regarding difference between the values of the minute rotation time T30 at angular intervals different from each other. Particularly, the minute rotation time T30 is a period of time taken for rotation of an angular interval from 30° CA before a compression top dead center to the compression top dead center. The minute rotation time T30 is a value corresponding to nine appearing timings of the compression top dead center. Accordingly, group data of the values of the minute rotation time T30 constitutes a variable indicating the information regarding difference between the values of the minute rotation time T30 corresponding to the compression top dead center different from each other. These nine values of the minute rotation time T30 are all used in calculation of the inter-cylinder variable $\Delta Tb(2)$, and the fluctuation pattern variables FL[02], FL[12], FL[32].

Next, after executing the process of S22, the CPU 62 operates the communication device 69 to transmit the data acquired in the processes of S50, S22 to the center 90 together with identification information regarding the hybrid vehicle VC (S52). In the following description, the identification information regarding the hybrid vehicle VC is stated as a vehicle ID.

In response, the CPU 92 of the center 90 receives the transmitted data as shown in FIG. 7 (S60). The CPU 92 then substitutes the values of the variable acquired in the process of S60 into input variables x(1) to x(11+2q) (S62). Specifically, the CPU 92 substitutes the values of the minute rotation time T30(0), T30(6), T30(12), T30(18), T30(24), T30(30), T30(36), T30(42), T30(48) into the input variables x(1) to x(9), respectively. The CPU 92 also substitutes the value of the rotation speed NE into an input variable x(10), and substitutes the value of the charging efficiency 11 into an input variable x(11), respectively. The CPU 92 further substitutes the values of the drive state variable TM1(1) to TM1($q$) into input variables x(12) to x(11+q), and substitutes the values of drive state variable TM2(1) to TM2($q$) into input variables x(12+q) to x(11+2q), respectively.

Next, the CPU 92 inputs the input variables x(1) to x(11+2q) into the detection mapping that is defined by the mapping data 96a stored in the memory 96 shown in FIG. 5 so as to calculate the value of the combustion state variable PR that is an output value of the detection mapping (S64).

In the present embodiment, the detection mapping is constituted of a neural network having "α" intermediate layers and an output layer. The intermediate layers respectively have activation functions h1 to hα that are ReLU. The output layer has an activation function that is a softmax function. For example, in a first intermediate layer, the values of nodes are generated by inputting the input variables x(1) to x(11+2q) into a linear mapping defined by a coefficient w(1)ji (j=0 to n1, i=0 to 11+2q) and inputting an obtained output into the activation function h1. Specifically, on the assumption that m=1, 2, . . . , α, the values of the nodes in m-th intermediate layer are generated by inputting an output of a linear mapping defined by a coefficient w(m) into an activation function hm. In FIG. 7, n1, n2, . . . , nα are the number of nodes in each of the first, second, . . . , α-th intermediate layers, respectively. Incidentally, the coefficient w(1)j0, or the like, is a bias parameter, and the input variable x(0) is defined as "1".

Next, the CPU 92 operates the communication device 99 to transmit a signal indicating the value of the combustion state variable PR to the hybrid vehicle VC to which the data received in the process of S60 was transmitted (S66), and temporarily terminates a series of the processes shown in FIG. 7. In response to this, the CPU 62 receives the value of the combustion state variable (S54), and executes the processes of S28 to S38 as shown in FIG. 6.

Thus, in the present embodiment, since the process in S64 is executed in the center 90, the arithmetic load of the CPU 62 can be reduced.

Third Embodiment

Hereinafter, a third embodiment will be described with the attention mainly given to the differences from the aforementioned embodiments with reference to the drawings.

The state detection system in each of the aforementioned embodiments is configured as a system that detects the state where a misfire has occurred in the internal combustion engine 10, based on the rotation fluctuation of the crankshaft 24. In the case where the air-fuel ratio varies between the cylinders, and therefore air-fuel ratio imbalance between the cylinders occurs, the combustion states of the cylinders also vary, which causes increased rotation fluctuation of the crankshaft 24. The state detection system of the present embodiment is configured as a system that detects such air-fuel ratio imbalance between the cylinders. The configuration of the state detection system of the present embodiment is basically the same as the configuration shown in FIG. 1. However, the ROM 64 in the state detection system of the present embodiment stores a program for detecting air-fuel ratio imbalance between cylinders instead of the misfire program 64a shown in FIG. 1.

Figure 8:
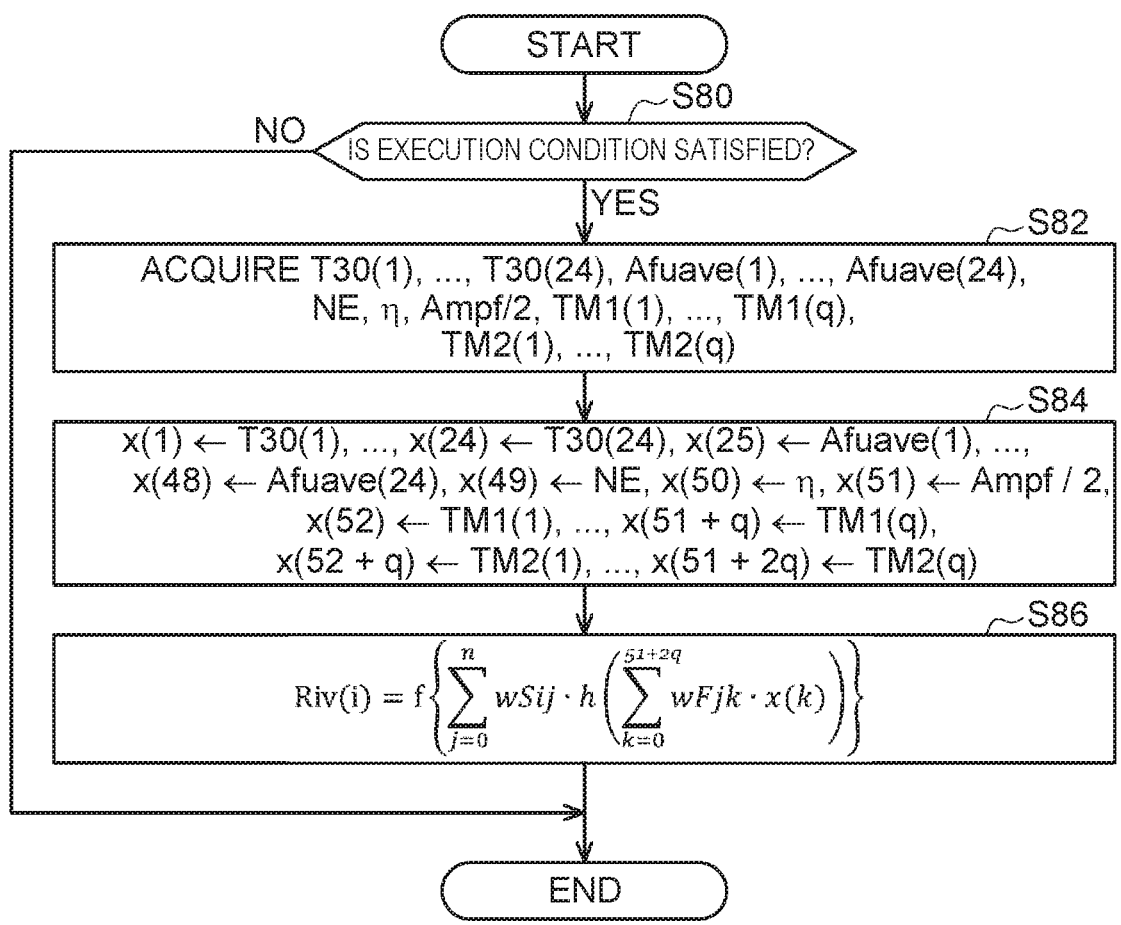
FIG. 8 is a flowchart of a process defined as a misfire program in the state detection system of a third embodiment.

FIG. 8 shows the procedures of the processes regarding detection of the air-fuel ratio imbalance between the cylinders. The processes shown in FIG. 8 are implemented when the CPU 62 repeatedly executes the detection program stored in the ROM 64 in every predetermined control cycle.

In a series of the processes shown in FIG. 8, the CPU 62 first determines whether or not an execution condition of the imbalance detection process is established (S80). The execution condition includes that purging of fuel vapor or recycling of exhaust gas with respect to intake air of the internal combustion engine 10 is not conducted.

Next, the CPU 62 acquires values of the minute rotation time T30(1), T30 (2), . . . , T30(24), upstream-side averages Afuave(1), Afuave(2), . . . , Afuave(24), rotation speed NE, charging efficiency η, 0.5-order amplitude Ampf/2, and the drive state variables TM1(1) to TM1($q$), TM2(1) to TM2($q$) (S82). When m=1 to 24, the upstream-side average Afuave (m) is an average value of the upstream-side detection values Afu at an angular interval of 30° CA that is same as each of the minute rotation time T30($m$). The 0.5-order amplitude Ampf/2 is the intensity of a 0.5-order component of the rotational frequency of the crankshaft 24. The CPU 62 calculates the 0.5-order amplitude Ampf/2 by Fourier transform of the time series data of the minute rotation time T30.

Next, the CPU 62 substitutes the values acquired in the process of S12 into input variable x(1) to x(51+2q) of the detection mapping that outputs an imbalance rate Riv (S84). More specifically, on the assumption that "m=1 to 24", the CPU 62 substitutes the value of the minute rotation time T30($m$) into the input variable x(m), substitutes the value of the upstream-side average Afuave(m) into the input variable x(24+m), substitutes the value of the rotation speed NE into the input variable x(49), substitutes the value of the charging efficiency rl into the input variable x(50), and substitutes the value of 0.5-order amplitude Ampf/2 into the input variable x(51). The CPU 62 also substitutes the values of the drive state variable TM1(1) to TM1($q$) into the input variable x(52) to x(51+q), and substitutes the values of the drive state variable TM2(1) to TM2($q$) into the input variable x(52+q) to x(51+2q), respectively.

In the present embodiment, the imbalance rate Riv is "0" in the cylinder in which fuel of a target injection amount is injected. The imbalance rate Riv is a positive value when an actual injection amount is larger than the target injection amount, whereas the imbalance rate Riv is a negative value when the actual injection amount is smaller than the target injection amount.

Next, the CPU 62 inputs the input variable x(1) to x(51+2q) into the detection mapping defined by the mapping data 66a stored in the memory 66 shown in FIG. 1 so as to calculate each of the imbalance rates Riv(1) to Riv(4) of the cylinder #i (i=1 to 4) (S86).

In the present embodiment, the detection mapping is constituted of a neural network having one intermediate layer. The neural network includes an input-side coefficient wFjk (j=0 to n, k=0 to 51+2q), and an activation function h(x) as an input-side nonlinear mapping that performs nonlinear conversion of each of the outputs of an input-side linear mapping that is a linear mapping defined by the input-side coefficient wFjk. In the present embodiment, a hyperbolic tangent "tanh(x)" is illustrated as the activation function h(x). The neural network includes an activation function f(x) as an output-side nonlinear mapping that performs nonlinear conversion of an output of an output-side linear mapping that is a linear mapping defined by an output-side coefficient wSij (i=1 to 4, j=0 to n) and an output-side coefficient wSij. In the present embodiment, the hyperbolic tangent "tanh(x)" is illustrated as the activation function f(x). The value n represents the dimension of the intermediate layer.

Figure 9:
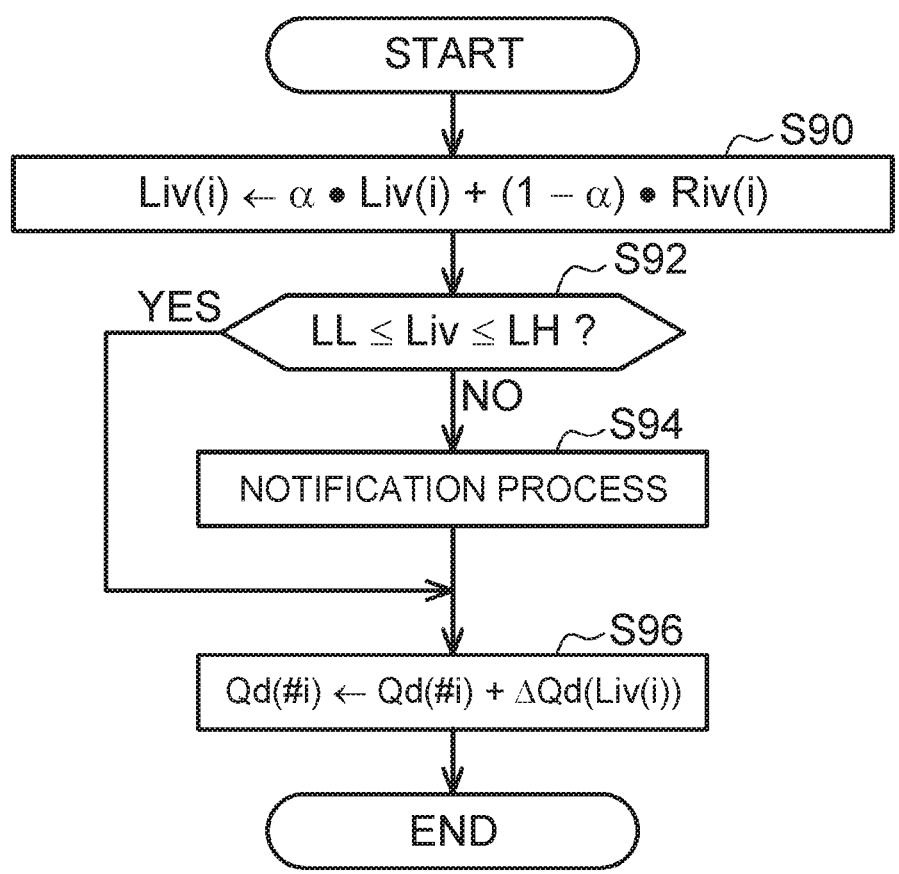
FIG. 9 is a flowchart of a process defined as a handling program in the state detection system.

When the process of S86 is completed, or when negative determination is made in the process of S80, the CPU 62 temporarily terminates a series of the processes shown in FIG. 8. FIG. 9 shows the procedures of the processes using the imbalance rate Riv(i). The processes shown in FIG. 9 are implemented, when the CPU 62 repeatedly executes the handling program stored in the ROM 64 shown in FIG. 1 whenever the imbalance rate Riv(i) is calculated, for example.

In a series of the processes shown in FIG. 9, the CPU 62 first updates the imbalance learning value Liv(i) by an index moving average process that takes, as an input, the value of the imbalance rate Riv(i) that is newly calculated in the processes of FIG. 8 (S90). Specifically, the CPU 62 updates the imbalance learning value Liv with the sum of a value obtained by multiplying a coefficient α by the imbalance learning value Liv(i) stored in the memory 66 and a value obtained by multiplying the imbalance rate Riv(i) by "1−α" (S90). Note that "0<α<1."

Next, the CPU 62 determines whether or not the imbalance learning value Liv(i) is equal to or more than a lean-side tolerance limit LL and is equal to or less than a rich-side tolerance limit LH (S92). When determining that the imbalance learning value Liv(i) is less than the lean-side tolerance limit LL, or is larger than the rich-side tolerance limit LH (S92: NO), the CPU 62 operates an alarm lamp 78 to execute the notification process in order to encourage a user to make repairs (S94).

Meanwhile, when determining that the imbalance learning value Liv(i) is more than the lean-side tolerance limit LL, and is equal to or less than the rich-side tolerance limit LH (S92: YES), or when the process of S94 is completed, the CPU 62 corrects a request injection amount Qd(#i) of each cylinder (S96). Specifically, the CPU 62 corrects the request injection amount Qd(#i) by adding a correction amount AQd(Liv(i)) corresponding to the imbalance learning value Liv(i) to the request injection amount Qd(#i) of each cylinder. Here, when the imbalance learning value Liv(i) is larger than zero, the correction amount AQd(Liv(i)) is a negative value, whereas when the imbalance learning value Liv(i) is smaller than zero, the correction amount AQd(Liv(i)) is a positive value. When the imbalance learning value Liv(i) is zero, the correction amount AQd(Liv(i)) becomes zero either.

The CPU 62 temporarily terminates a series of the processes shown in FIG. 9, when the process of S96 is completed. In the present embodiment, when positive determination is made in the process of S80, and then the process of S82 is executed, the process of S96 is temporarily stopped.

Incidentally, the mapping data 66a in the present embodiment is generated as shown below, for example. First, based on measurement performed in advance using a single unit, a plurality of fuel injection valves 20 that present various values other than zero as the imbalance rate Riv, and three fuel injection valves 20 that present zero as the imbalance rate are prepared. An internal combustion engine 10, mounted with the three fuel injection valves 20 that present zero as the imbalance rate and one fuel injection valve 20 that presents the imbalance rate other than zero, is operated while the crankshaft 24 is connected to a dynamometer in a test bench. The imbalance rates Rivt of the mounted fuel injection valves 20 are each used as teacher data.

With use of the first waveform variable acquired each time and the value acquired in the process of S82, the value of the imbalance rate Rivt is calculated by the same processes as in S84, S86. The values of the input-side coefficient wFjk and the output-side coefficient wSij are learned, so as to reduce the difference between the thus-learned imbalance rate Rivt and the teacher data. Specifically, the values of the input-side coefficient wFjk and the output-side coefficient wSij may be learned so as to minimize cross entropy, for example. The torque of the first motor-generator 42 and the second motor-generator 44 can be simulated with the torque applied to the crankshaft 24 by the dynamometer.

In the present embodiment, the second waveform variable that is a variable indicating the time series data of the torque of the first motor-generator 42 and the torque of the second motor-generator 44 are included as an input to the detection mapping. Accordingly, the imbalance rate Rivt can be calculated as a value reflecting the influence that the drive states of the first motor-generator 42 and the second motor-generator 44 exert on the rotation behavior of the crankshaft 24. Therefore, it is possible to enhance the detecting accuracy of the air-fuel ratio imbalance between the cylinders in the internal combustion engine 10 having the crankshaft 24 that is mechanically coupled with the first motor-generator 42 and the second motor-generator 44.

Correspondence Relation

The memory corresponds to the memory 66. The first waveform variable corresponds to the inter-cylinder variable ΔTb(2), the fluctuation pattern variables FL[02], FL[12], FL[32]. The first processor corresponds to the CPU 62 and the ROM 64. The second processor corresponds to the CPU 92 and the ROM 94. The acquisition process corresponds to the processes of S50, S22, S82. The vehicle-side reception process corresponds to the process of S54. The outer-side reception process corresponds to the process of S60, the output value calculation process corresponds to the processes of S62, S64, S86, the outer-side transmission process corresponds to the process of S66, and the determination process corresponds to the processes of S28, S30, S34, S92, respectively. The data analysis device corresponds to the center 90.

In the first embodiment and the second embodiment, the state where a misfire has occurred corresponds to the predetermined operating state, and in the third embodiment, the state where an air-fuel ratio varies between the cylinders corresponds to the predetermined operating state. In the third embodiment, the imbalance rate Rivt corresponds to the combustion state variable.

Other Embodiments

The present embodiment can be implemented with modifications as shown below. The present embodiment and following modifications may be implemented in combination with each other without departing from the range of technically consistency.

Inter-Cylinder Variable

The inter-cylinder variable ΔTb is not limited to a different between values of the minute rotation time T30 corresponding to the compression top dead centers of a pair of cylinders that are adjacent in appearing timing of the compression top dead center to each other, the difference being a difference between the values separated by 720° CA. For example, the inter-cylinder variable ΔTb may be a difference between values of minute rotation time T30 corresponding to the compression top dead centers of the cylinders having the appearance timing of the compression top dead center being separated by 360° CA from each other, the difference being a difference of the values separated by 720° CA. In this case, the inter-cylinder variable ΔTb(2) is equal to "T30(12)−T30 (24)−{T30(36)−T30(48)}".

The inter-cylinder variable ΔTb is not limited to the difference between values of the minute rotation time T30 corresponding to the compression top dead centers of a pair of cylinders, the values being a difference of the values separated by 720° CA. The inter-cylinder variable ΔTb may be a difference between values of the minute rotation time T30 corresponding to the compression top dead centers of a cylinder as a misfire detection target and a cylinder other than the cylinder as a misfire detection target.

For example, the inter-cylinder variable may be a ratio between values of the minute rotation time T30 corresponding to the compression top dead centers of a pair of cylinders. The minute rotation time used for defining the inter-cylinder variable ΔTb is not limited to the time taken for rotation of 30° CA. For example, the minute rotation time may be the time taken for rotation of 45° CA, or the like. In that case, it is desirable that the minute rotation time is the time taken for rotation of an angular interval equal to or less than the interval of appearance of the compression top dead center.

Furthermore, in the above configuration, an instant rotation speed, obtained by dividing a prescribed angular interval by the time taken for rotation of a prescribed angular interval, may be used instead of the minute rotation time.

Fluctuation Pattern Variable

Definition of the fluctuation pattern variable is not limited to the definition illustrated in the embodiments. For example, the definition of the fluctuation pattern variable may be changed by changing the inter-cylinder variable ΔTb to the variable illustrated in the column "Inter-Cylinder Variable", or other variables.

Furthermore, it is not essential to define the fluctuation pattern variable as a ratio between values of the inter-cylinder variable ΔTb corresponding to the appearance timings of the compression top dead center that are different from each other. The fluctuation pattern variable may be a difference instead of the ratio. In this case, including the operating point variable of the internal combustion engine 10 in an input makes it possible to calculate the value of the combustion state variable PR that reflects that the size of the fluctuation pattern variable changes in accordance with the operating point.

Second Waveform Variable

In the embodiments, a variable indicating the time series data of the torque of the first motor-generator 42 and the torque of the second motor-generator 44 is used as the second waveform variable. However, a variable indicating the time series data of the change amounts of the torque may be used as the second waveform variable. It is also possible to use a variable indicating the time series data of the torque of only one of the first motor-generator 42 and the second motor-generator 44 as the second waveform variable. For example, in such a case where the influence that the drive state of the second motor-generator 44 exerts on the rotation behavior of the crankshaft 24 is smaller than the influence that the drive state of the first motor-generator 42 exerts on the rotation behavior of the crankshaft 24, the detecting accuracy of a misfire or the air-fuel ratio imbalance between cylinders may still be secured even with use of only the time series data of the torque of the first motor-generator 42 as a second waveform variable.

State Quantity Representing Drive State of Motor-Generators

Although the torque of the motor-generators is used as the state quantity in the embodiments, parameters of the motor-generators such as a rotation speed, a voltage, and an electric current value, may be used as the state quantity.

First Waveform Variable

In the process of S26, the inter-cylinder variable ΔTb(2), and the fluctuation pattern variables FL[02], FL[12], FL[32] constitute the first waveform variable. However, the first waveform variable is not limited to this configuration. For example, the fluctuation pattern variables that constitutes the first waveform variable may be any one or two of the fluctuation pattern variables FL[02], FL[12], FL[32]. The fluctuation pattern variables may also include four or more fluctuation pattern variables, such as the fluctuation pattern variables FL[02], FL[12], FL[32], FL[42].

In the process of S64, the values of the minute rotation time T30 corresponding to each of the nine timings, different in appearance timing of the compression top dead center from each other, constitute the first waveform variable.

However, the first waveform variable is not limited to this configuration. For example, with use of the compression top dead center of the cylinder to be a target of misfire detection as a center, a section that is twice or above the angular interval at which the compression top dead center appears is divided into subsections at intervals of 30° CA, and the value of the minute rotation time T30 in each of the subsections may constitute the first waveform variable. In the above configuration, it is not essential to use the compression top dead center of the cylinder to be a misfire detection target as a center. Furthermore, the minute rotation time is not limited to the time taken for rotation at intervals of 30° CA. Instead of the minute rotation time, an instant rotation speed, obtained by dividing a prescribed angular interval by the time taken for rotation of the prescribed angular interval, may be used.

Operating Point Variable

The operating point variable is not limit to the rotation speed NE and the charging efficiency η. For example, the operating point variable may be an intake air amount Ga and the rotation speed NE. When a compression ignition type internal combustion engine is used as stated in the column "Internal Combustion Engine" below, the operating point variable may be an injection amount and the rotation speed NE. It is not essential to use the operating point variable as an input of the detection mapping. For example, in such a case where the internal combustion engine is driven exclusively in a specific operating point when the system is applied to an internal combustion engine mounted on a series hybrid vehicle described in the column "Vehicle" below, the value of the combustion state variable PR can be calculated with high accuracy without the operating point variable being included in the input variables.

Outer-Side Transmission Process

In the process of S66, the value of the combustion state variable PR is transmitted. However, the value to be transmitted is not limited to the combustion state variable PR. For example, the values of prototype variables yR(1), yR (2) used as an input of the softmax function that serves as an output activation function may be transmitted. For example, the center 90 may execute the processes of S28 to S36, and transmit the determination result regarding whether or not there is any abnormality.

Handling Process

In the embodiments, the alarm lamp 78 is operated to notify the occurrence of a misfire through visual information. However, notification may be performed by other ways. For example, a speaker may be operated to notify the occurrence of a misfire through auditory information. For example, the controller 60 shown in FIG. 1 may include a communication device 69, and a process may be provided to transmit a signal indicating the occurrence of a misfire to the mobile terminal of a user through operation of the communication device 69. The process can be implemented by installing an application program that executes the notification on the user's mobile terminal in advance.

The handling process is not limited to the notification process. For example, the handling process may be an operation process that is to operate an operation unit, configured to control combustion of air-fuel mixture in the combustion chambers 18 of the internal combustion engine 10, in accordance with the information indicating the occurrence of a misfire. Specifically, for example, the ignition devices 22 may be used as the operation units, and the operation unit of a cylinder, in which a misfire has occurred, may advance the ignition timing. For example, the fuel injection valves 20 may be used as the operation units, and the operation unit of a cylinder, in which a misfire has occurred, may increase the fuel injection amount.

Input into Detection Mapping

An input such as an input into the neural network and an input into a regression described in the column "Algorithm of Machine Learning" below is not limited to an input constituted of physical values or the fluctuation pattern variables FL which are single in each dimension. For example, some of a plurality of types of physical values or fluctuation pattern variables FL, used as an input into the detection mapping in the above embodiments and the like, may be subjected to analysis of principal components, instead of being used as a direct input into the neural network or the regression, and some of the principal components thereof may be used as a direct input into the neural network or the regression. However, when the principal components are used as an input into the neural network or the regression, it is not essential that the principal components are used as only a portion of the input into the neural network of the regression. Rather, the entire input may be made up of the principal components. When the principal components are used as an input into the detection mapping, the mapping data 66a, 96a include data for defining a detection mapping that defines the principal components.

Mapping Data

The mapping data that defines mappings used for arithmetic operations executed in the vehicle may be defined as the data that defines the mapping illustrated in the process of S64.

For example, according to the description in FIG. 7, the neural network has two or more intermediate layers. However, the number of the intermediate layers is not limited to this. In the embodiments, the activation functions h, h1, h2, . . . , hα are set to ReLU, and the output activation function is set to the softmax function. However, the activation functions are not limited to these. For example, the activation functions h, h1, h2, . . . , hα may be hyperbolic tangent functions. For example, the activation functions h, h1, h2, . . . , hα may be logistic sigmoid functions.

For example, the output activation functions may be logistic sigmoid functions. In this case, for example, an output layer may have one node, and an output variable may be the combustion state variable PR. If that is the case, the presence or absence of abnormality can be determined such that when the value of the output variable is equal to or greater than a prescribed value, abnormality is determined.

Algorithm of Machine Learning

The algorithm of machine learning is not limited to those using the neural network. For example, a regression may also be used. The regression corresponds to the neural network without any intermediate layer. A support vector machine may also be used, for example. In this case, there is no meaning in the size of the value of an output itself. Whether a misfire has occurred or not is expressed based on whether the value is positive or not. In other words, the combustion state variable has a value of three or more, and the size of these values do not express the magnitude of the probability of a misfire.

Learning Step

Learning is executed in the situation where a misfire occurs at random in the embodiments. However, learning is not necessarily executed in this situation. For example, learning may be executed in the situation where a misfire continuously occurs in a specific cylinder. However, in that case, it is desirable that the inter-cylinder variable ΔTb used for the inter-cylinder variable or the fluctuation pattern variable that are used as an input into the mapping is a difference, or the like, between the values of the minute rotation time T30 corresponding to the compression top dead centers of a cylinder to be a misfire detection target and a cylinder other than the target cylinder, as stated in the column "Inter-Cylinder Variable".

Learning is not limited to the learning based on the rotation behavior of the crankshaft 24 when the internal combustion engine 10 is operated with the crankshaft 24 being connected to a dynamometer. For example, learning may be performed based on the rotation behavior of the crankshaft 24 when the internal combustion engine 10 is mounted on a vehicle, and the vehicle is made to travel. With this configuration, the influence exerted on the rotation behavior of the crankshaft 24 by the state of the road surface on which the vehicle travels can be reflected on learning.

Data Analysis Device

For example, instead of the processes of S62, S64, the processes of S24, S26, or the like, may be executed in the center 90.

The processes of FIG. 7 may be executed, for example, with the mobile terminal possessed by a user. This can be achieved by installing an application program that executes the processes of FIG. 7 on the mobile terminal in advance. In this case, the process of transmitting and receiving the vehicle ID may be deleted by setting such that an effective distance of data transmission in the process of S52 is about the length of the vehicle, for example.

Processor

The processor is not limited to those including the CPU 62 (92) and the ROM 64 (94) and configured to execute software processing. For example, the system may include a dedicated hardware circuit (for example, an ASIC, etc.) for hardware processing of at least some of the processes that are processed by software in the embodiments. Specifically, the processor may have any one of the configurations (a) to (c): (a) including a processing unit that executes all the processes based on programs, and a program storage device such as a ROM that stores the programs; (b) including a processing unit that executes some of the processes based on programs, a program storage device, and a dedicated hardware circuit that executes the remaining processes; and (c) including a dedicated hardware circuit that executes all the processes. Here, the number of software processors including a processing device and a program storage device, or the number of the dedicated hardware circuits may be two or more.

Memory

In the embodiments, the memory that stores the mapping data 66a, 96a, and the memory (ROM 64, 94) that stores the misfire program 64a and the misfire main program 94a are provided as separate units. However, the memory may have other configurations.

Computer

The computer is not limited to those constituted of a processor, such as the CPU 62 and the ROM 64, mounted on a vehicle, and a processor, such as the CPU 92 and the ROM 94, included in the center 90. For example, the computer may be constituted of a processor mounted on the vehicle, a processor included in the center 90, and a processor, such as a CPU and a ROM, in a user's mobile terminal. This configuration can be achieved by, for example, setting the process of S66 in FIG. 7 as a process of transmitting to the user's mobile terminal, and setting the processes of S54, S28 to S36 to be executed in the mobile terminal.

Predetermined Operating State

The operating states of the internal combustion engine 10 other than the misfire or the air-fuel ratio imbalance between cylinders may also be used as detection target of the state detection system, as long as the operating states involve variation in combustion state between the cylinders. For example, when what is called compression insufficiency occurs in a specific cylinder, that is, compression of intake air in the cylinder becoming insufficient due to the intake valve or the exhaust valve being opened and fixed, the combustion state varies between the cylinders, which causes increased rotation fluctuation of the crankshaft 24. Accordingly, detecting such compression insufficiency with use of the detection mapping that takes the aforementioned first waveform variable and the second waveform variable as an input makes it possible to detect the compression insufficiency with high accuracy by taking the influence that the drive states of the motor-generators exert on the rotation behavior of the crankshaft 24 into account.

Internal Combustion Engine

In the embodiments, the cylinder injection valves that inject fuel into the combustion chambers 18 are illustrated as the fuel injection valves. However, the fuel injection valves are not limited to the cylinder injection valves. For example, the fuel injection valves may be port injection valves that inject fuel into the intake passage 12. Moreover, the internal combustion engine may have both the port injection valves and the cylinder injection valves, for example.

The internal combustion engine is not limited to the spark ignition type internal combustion engine. For example, other internal combustion engines such as a compression ignition type internal combustion engine that uses light oil as fuel may also be used.

Hybrid Vehicle

Although the hybrid vehicle VC in the embodiments have two motor-generators, the hybrid vehicle may have one motor-generator or three or more motor-generators.

What is claimed is:

1. A state detection system for an internal combustion engine, the state detection system being applied to the internal combustion engine including a crankshaft that is mechanically coupled with a motor-generator, the state detection system being configured to detect a predetermined operating state of the internal combustion engine, the predetermined operating state involving a variation in a combustion state between cylinders, the state detection system comprising:

a memory configured to store mapping data, the mapping data being data that defines a detection mapping, the detection mapping being a mapping between an input and an output, the input being a first waveform variable and a second waveform variable and the output being a value of a combustion state variable, and the detection mapping including a joint operation of the first waveform variable and the second waveform variable based on a parameter learned by machine learning, the first waveform variable being a variable including information on a difference in rotation speed of the crankshaft between the cylinders during a period when combustion torque is generated in each of the cylinders, the second waveform variable being a variable indicating time series data of a state quantity indicating a drive state of the motor-generator, the combustion state variable being a variable relating to a degree of variation in the combustion state between the cylinders; and a processor configured to execute an acquisition process and a determination process, the acquisition process being a process of acquiring values of the first waveform variable and the second waveform variable, the value of the first waveform variable being acquired based on an output of a sensor that detects a rotation behavior of the crankshaft, the determination process being configured to determine whether or not the internal combustion engine is in the predetermined operating state, based on an output value of the detection mapping that takes the values of the first waveform variable and the second waveform variable acquired in the acquisition process as an input.

2. The state detection system according to claim 1, wherein the predetermined operating state is a state where a misfire has occurred.

3. The state detection system according to claim 1, wherein the predetermined operating state is a state where an air-fuel ratio varies between the cylinders.

4. The state detection system according to claim 1, wherein the state quantity is torque of the motor-generator.

5. The state detection system according to claim 1, wherein when it is determined by the determination process that the internal combustion engine is in the predetermined operating state, the processor is configured to operate prescribed hardware to execute a handling process for handling the predetermined operating state.

6. The state detection system according to claim 1, wherein:

the determination process includes an output value calculation process for calculating an output value of the detection mapping that takes the values of the first waveform variable and the second waveform variable acquired in the acquisition process as an input;

the processor includes a first processor mounted on a vehicle, and a second processor disposed outside the vehicle;

the first processor is configured to execute the acquisition process and a vehicle-side reception process for receiving a signal based on a calculation result of the output value calculation process; and the second processor is configured to execute the output value calculation process and an outer-side transmission process for transmitting to the vehicle a signal based on the calculation result of the output value calculation process.

7. The state detection system according to claim 6, wherein the second processor and the memory are included in a data analysis device.

8. The state detection system according to claim 6, wherein the first processor is included in a hybrid vehicle.

* * * * *